(12) United States Patent
Kazmi et al.

(10) Patent No.: US 10,674,527 B2
(45) Date of Patent: *Jun. 2, 2020

(54) NETWORK NODE AND METHOD THEREIN FOR HANDLING SCHEDULING OF ONE OR MORE WIRELESS DEVICES; A WIRELESS DEVICE AND A METHOD THEREIN

(71) Applicant: GUANGDONG OPPO MOBILE TELECOMMUNICATIONS CORP., LTD., Dongguan, Guangdong (CN)

(72) Inventors: Muhammad Kazmi, Bromma (SE); Santhan Thangarasa, Vallingby (SE); Iana Siomina, Taby (SE)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,329

(22) Filed: May 20, 2019

(65) Prior Publication Data

US 2019/0327754 A1    Oct. 24, 2019

Related U.S. Application Data

(63) Continuation of application No. 15/309,670, filed as application No. PCT/SE2015/050022 on Jan. 14, 2015, now Pat. No. 10,299,285.

(Continued)

(51) Int. Cl.
*H04W 72/12* (2009.01)
*H04L 5/14* (2006.01)

(52) U.S. Cl.
CPC ........... *H04W 72/1257* (2013.01); *H04L 5/14* (2013.01); *H04W 72/1231* (2013.01)

(58) Field of Classification Search
CPC ... H04L 1/1635; H04L 1/1685; H04L 1/1854; H04L 1/1864; H04L 5/14; H04L 1/1893;
(Continued)

(56) References Cited

U.S. PATENT DOCUMENTS 9,515,696 B2 * 12/2016 Lee .................. H04L 1/1819
2009/0092066 A1 * 4/2009 Chindapol ............ H04W 76/45
370/277

(Continued)

OTHER PUBLICATIONS

R1-121427, LG Electronics, Text proposal on Half Duplex for TR 36.888, 3GPP TSG RAN WG1#68bis, Jeju, Korea, Mar. 26-30, 2012, pp. 1-4.

(Continued)

*Primary Examiner* — Phuc H Tran
(74) *Attorney, Agent, or Firm* — Finnegan, Henderson, Farabow, Garrett & Dunner, LLP

(57) ABSTRACT

Method performed by a first network node (111) for handling scheduling of wireless devices. The first network node (111) obtains information about a first type of time resource used by HD-FDD wireless devices (151). The first network node (111) also obtains information about a second type of time resource not used by the HD-FDD wireless devices (151) due to a transition at the HD-FDD wireless devices (151) between UL and DL. The first network node (111) schedules a first wireless device out of FD-FDD wireless devices (152) during the second type of time resource, based on the obtained information about the second type. The first network node (111) decides whether or not to schedule a second wireless device out of the FD-FDD wireless devices (152) during the first type of time resource, based on the obtained information about the first type, and further based on whether first conditions are met.

16 Claims, 6 Drawing Sheets

Related U.S. Application Data

(60) Provisional application No. 61/990,765, filed on May 9, 2014.

(58) Field of Classification Search
CPC ..... H04L 43/16; H04L 5/0023; H04L 5/0048; H04W 72/1231; H04W 72/1257
See application file for complete search history.

(56) References Cited

U.S. PATENT DOCUMENTS

| | | | | |
|---|---|---|---|---|
| 2009/0092067 | A1* | 4/2009 | Sudarshan | H04B 7/2656 370/281 |
| 2009/0268645 | A1* | 10/2009 | Chindapol | H04L 5/0007 370/281 |
| 2009/0296609 | A1* | 12/2009 | Choi | H04W 72/121 370/281 |
| 2013/0128782 | A1* | 5/2013 | Boixadera | H04L 5/16 370/281 |

OTHER PUBLICATIONS

R2-052376, IPWireless, Some Considerations Related to Half Duplex Operation, 3GPP TSG RAN WG2#48bis, Cannes, France, Oct. 10-14, 2005, pp. 1-6.

Intonational Search Report from International Application No. PCT/SE2015/050022, dated Sep. 21, 2015.

* cited by examiner

NETWORK NODE AND METHOD THEREIN FOR HANDLING SCHEDULING OF ONE OR MORE WIRELESS DEVICES; A WIRELESS DEVICE AND A METHOD THEREIN

CLAIM FOR PRIORITY

This application is a continuation of U.S. patent application Ser. No. 15/309,670, filed Nov. 8, 2016 (now allowed), which is a U.S. National Phase entry under 35 U.S.C. § 371 from PCT International Application No. PCT/SE2015/050022, filed Jan. 14, 2015, which claims priority to U.S. Provisional Patent Application No. 61/990,765, filed May 9, 2014, all of which are incorporated herein by reference.

TECHNICAL FIELD

The present disclosure relates generally to a first network node, and methods therein for handling scheduling of one or more wireless devices. The present disclosure also relates to a wireless device, and methods therein for performing one or more operations. The present disclosure relates as well to computer programs and computer-readable storage mediums, having stored thereon the computer programs to carry out the aforementioned methods.

BACKGROUND

Communication devices such as wireless devices are also known as, e.g., User Equipments (UE), mobile terminals, wireless terminals and/or mobile stations. Wireless devices are enabled to communicate wirelessly in a cellular communications network or wireless communication system, sometimes also referred to as a cellular radio system, wireless communications network, or cellular network. The communication may be performed, e.g., between two wireless devices, between a wireless device and a regular telephone, and/or between a wireless device and a server via a Radio Access Network (RAN) and possibly one or more core networks, comprised within the cellular communications network.

Wireless devices may further be referred to as mobile telephones, cellular telephones, laptops, tablets or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless communications network covers a geographical area which is divided into cell areas, wherein each cell area being served by an access node such as a base station, e.g., a Radio Base Station (RBS), which sometimes may be referred to as, e.g., "Evolved Node B (eNB)", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Half Duplex Operation

In Half Duplex (HD), or more specifically in Half Duplex Frequency Division Duplex (HD-FDD), the UL and DL transmissions take place on different paired carrier frequencies, but not simultaneously in time, in the same cell. This means the UL and DL transmissions take place in different time resources. Examples of time resource are symbol, time slot, subframe, Transmission Time Interval (TTI), interleaving time etc. . . . . . In other words, UL and DL, e.g., subframes, do not overlap in time. The number and location of subframes used for DL, UL or unused subframes may vary on the basis of frame or multiple frames. For example, in one radio frame, e.g., frame #1, subframes #9, #0, #4 and #5 may be used for DL and subframes #2 and #7 are used for UL transmission. But in another frame, e.g., frame #2, subframes #0 and #5 may be used for DL and subframes #2, #3, #5, #7 and #8 are used for UL transmission.

Machine Type Communication (MTC)

The Machine-to-Machine (M2M) communication, or aka, MTC, may be used for establishing communication between machines and between machines and humans. The communication may comprise exchange of data, signaling, measurement data, configuration information etc. . . . . . The device size may vary from that of a wallet to that of a base station. The M2M devices may be often used for applications like sensing environmental conditions, e.g. temperature reading, metering or measurement, e.g., electricity usage etc . . . , fault finding or error detection etc. . . . . . In these applications, the M2M devices may be active very seldom, but over a consecutive duration depending upon the type of service, e.g., about 200 milliseconds (ms) once every 2 seconds, about 500 ms every 60 minutes etc. . . . . . The M2M device may also do measurements on other frequencies or other RATs.

Low-Cost MTC

It is envisaged that MTC UEs may be deployed in the future in huge numbers, large enough to create an ecosystem on its own. Lowering the cost of MTC UEs may enable implementation of the concept of the "internet of things". MTC UEs used for many applications may require low operational power consumption and are expected to communicate with infrequent small burst transmissions. Therefore, one category of M2M devices is referred to as low cost devices. For example, the cost reduction may be realized by having just a single receiver in the UE. The cost may be further reduced by having single receiver and HD-FDD capability. A low cost UE may also implement additional low cost features such as, smaller DL and UL maximum transport block size, e.g., 1000 bits, and reduced DL channel bandwidth of 1.4 MHz for data channel, e.g. Physical Downlink Shared CHannel (PDSCH). For example, a low cost UE may comprise a HD-FDD, and one or more of the following additional features: single receiver, smaller DL and/or UL maximum transport block size, e.g., 1000 bits, and reduced DL channel bandwidth of 1.4 MHz for data channel.

HD Operation of Low-Cost MTC

HD-FDD operation is a technique that may lower the cost of an MTC UE by simplifying the Radio Frequency (RF) implementation. By not requiring simultaneous transmission and reception, an HD-FDD MTC UE does not require a duplexer: in place of a duplexer a switch may be used. The eNB may still use Full Duplex FDD (FD-FDD) operation and may be required to ensure that there are no scheduling conflicts for HD-FDD MTC UEs. That is, the scheduler may ensure that a UE is not scheduled simultaneously in the DL and UL. This requirement may mean the scheduler needs to consider data and control traffic in both directions when making scheduling decisions for an MTC UE. This requirement may add to the complexity of the scheduler. For full duplex UEs, such scheduling restrictions may not be needed: this may make concurrent support of HD-FDD and FD-FDD wireless devices more complicated. When not in Discontinuous Reception (DRX), the MTC UE may continuously receive DL physical channels except when instructed by the network to transmit in the UL or when transmitting unscheduled, contention-based, Physical Random Access CHannel (PRACH). A switching time may need to be observed by HD-FDD MTC UEs when transitioning from receive to transmit and vice versa, and this, may need to be taken into account by the scheduler.

HD-FDD operation may be implemented as a scheduler constraint, implying the scheduler may ensure that a UE is not scheduled simultaneously in the DL and UL. There are occasions when simultaneous/colliding DL and UL transmissions may not be avoided by scheduler constraints, for example, when the UE transmits an unscheduled, contention-based, PRACH that may not be predicted by the eNB. It is possible that the UE may transmit a PRACH at the same time that it is scheduled via Physical Downlink Control CHannel (PDCCH)/PDSCH in the DL. In this case, the UE may not be able to receive the PDCCH/PDSCH.

The following has been further observed on UE switching times during the MTC studies:

Switching time for the DL-to-UL transition may be created by allowing the UE to DRX the last Orthogonal Frequency Division Multiplexing (OFDM) symbols in a DL subframe immediately preceding an UL subframe.

Switching time for the UL-to-DL transition may be handled by setting an appropriate amount of timing advance in the UE. Timing Advance (TA) is a mechanism that may be used to ensure that all UL transmissions from wireless devices arrive time-aligned at the network node, e.g., eNodeB. TA is a negative offset between the start of the received DL subframe and transmitted UL subframe. By adjusting the value of the offset, the transmissions from the terminals may be controlled by the eNB. This switching time may be important when the UE is close to the cell centre, with near zero timing advance. The same adjustment of the UL timing from the eNB perspective may be also applied to full duplex UEs. The eNB may decide the appropriate amount of timing advance, e.g., by defining a UE requirement on a maximum allowed switching time.

UE Measurements

Radio measurements done by the UE may be typically performed on the serving as well as on neighbor cells over some known reference symbols or pilot sequences. The measurements may be done on cells on an intra-frequency carrier, on inter-frequency carrier(s), as well as on inter-RAT carriers(s), depending upon the UE capability, whether it supports that RAT. To enable inter-frequency and inter-RAT measurements for the UE requiring gaps, the network may have to configure the measurement gaps. During the measurement gaps there is no scheduled transmission in UL or DL. Instead, the wireless device may use the gaps to perform measurements on e.g., inter-frequency or inter-RAT cells.

The measurements may be done for various purposes. Some example measurement purposes may be: mobility, positioning, Self-Organizing Network (SON), Minimization of Drive Tests (MDT), Operation and Maintenance (O&M), network planning and optimization etc. Examples of measurements in LTE are Cell identification, aka Physical Cell Identifier (PCI), acquisition, Reference Symbol Received Power (RSRP), Reference Symbol Received Quality (RSRQ), Cell Global Identification (CGI) acquisition, Reference Signal Time Difference (RSTD), UE Reception (RX)-Transmission (TX) time difference measurement, Radio Link Monitoring (RLM), which consists of Out of synchronization (out of sync) detection and in synchronization (in-sync) detection etc. Channel State Information (CSI) measurements performed by the UE may be used for scheduling, link adaptation etc. by network. Examples of CSI measurements or CSI reports are Channel Quality Indicator (CQI), Precoding Matrix Indicator (PMI), Rank Indicator (RI) etc. They may be performed on reference signals like Cell Specific Reference Signal (CRS), CSI-Reference Signal (RS) or DeModulation Reference Signal (DMRS).

Radio Network Node Radio Measurements

In order to support different functions such as mobility, e.g., cell selection, handover etc., positioning a UE, link adaption, scheduling, load balancing, admission control, interference management, interference mitigation etc., the radio network node, e.g., base station, access point, relay, eNode B, may also perform radio measurements on signals transmitted and/or received by the radio network node. Examples of such measurements are Signal-to-Noise Ratio (SNR), Signal to Interference plus Noise Ratio (SINR), received interference power (RIP), Block Error Rate (BLER), propagation delay between UE and itself, transmit carrier power, transmit power of specific signals, e.g., Tx power of reference signals, positioning measurements like Timing Advance (TA), eNode B Rx-Tx time difference etc.

In existing methods, a UE may have to perform radio measurements, e.g., RSRP, RSRQ, UE Rx-Tx time difference etc . . . , on one or more cells during DL and/or UL subframes, depending upon the type of measurement. A FD-FDD UE may have full freedom to choose any DL and/or UL subframes which contain the appropriate reference signals, e.g., Primary Synchronization Signals (PSS)/Secondary Synchronization Signal (SSS), CRS, Positioning Reference Signals (PRS), Sounding Reference Signals (SRS) etc. . . . for doing the desired measurement. But a HD-FDD UE may not freely choose any subframe for performing such radio measurements. Instead, for a HD-FDD capable UE, the serving node of the UE may have to ensure that at least certain number of DL and UL subframes is available every N frames, where N≥1, at the UE for doing measurements. The switching from DL to UL, or from UL to DL, aka transition, may result in that the UE operating in HD-FDD mode is not able to receive some signals or channels in subframe/s falling between successive UL and DL subframes. Such subframes are unused by that HD-FDD UE. Typically, several HD-FDD UEs may require similar subframes for measurements, e.g., DL subframes 0 and 5, which contain PSS/SSS. This means unused subframes may be common for several HD-FDD UEs in the same cell. This leads to uneven interference and different performance between different subframes, e.g., unused subframes and subframes used for measurements. This may lead to significant performance degradation in certain subframes. In the existing methods, there is no systematic mechanism to ensure even distribution of different types of UEs across different subframes within a radio frame.

There are a number of constraints that the serving node of the UE, e.g., the scheduler, faces when assigning resources for HD-FDD UEs. As stated earlier, DL cell measurements, e.g., RSRP, RSRQ, may require a certain number of subframes. For FD-FDD UEs, this is not a problem since UL and DL may take place anytime simultaneously. However, this may be a constraint for HD-FDD UEs as the UE has to switch between UL and DL, and because of the unused subframe resulting from every switch. Therefore, the eNB scheduler may have to ensure that at least a certain number of DL and UL frames are available at the UE for doing measurements. This is a constraint in the scheduler because of the wasted subframe for every switch, or the switching time.

For HD-FDD UEs, in comparison to FD-FDD UEs, the same measurement period and sampling rate may not be sufficient because there may be more subframe constraints. This is exemplified in Table 1, wherein it is assumed that subframe 0 and 5 are reserved for cell identification data, and the UE receives a PDSCH transmission on subframe 3 and 4. This may require that the UE sends HARQ feedback in subframe 7 and 8. According to HARQ requirements in 3GPP TS 36.213 V12.1.0, 'Physical layer procedures (Release 12)', the UE may be required to provide HARQ feedback with a 4 subframe delay from point of reception, and the same requirement may also be valid for uplink transmission. This means that the eNB scheduler may have to reserve subframe 7 and 8 for UL. This adds a new constraint to HD-FDD UEs in addition to the switching-subframe constraint as described earlier, because for every transmission of data on DL, there may have to be a feedback on UL 4 subframe later. This means that the eNB scheduler may have to reserve subframe 6 and 9 to switch from DL to UL, and from UL to DL, respectively. In the table, the Broadcast CHannel is indicated as BCH. The Physical Hybrid ARQ Indicator CHannel is indicated as PHICH. In the particular example shown in this table, the PHICH has been received in subframes #1 and #2, as a matter of example, which are therefore, DL. A System Information Block is indicated as SIB. The Physical Uplink Control CHannel is indicated as PUCCH. The Physical Uplink Shared CHannel is indicated as PUSCH. The switching subframes are indicated as Guard Period (GP).

certain DL subframes of the measured cell, e.g., PCell, are available for HD-FDD UEs for measuring on the CRS for radio link monitoring purposes.

As mentioned earlier, existing methods lead to uneven interference and different performance between different subframes, e.g., unused subframes and subframes used for measurements, due to uneven distribution of different types of UEs across different subframes within a radio frame. This may lead to significant performance degradation in certain subframes. Additionally, existing methods may result in interrupted communications due to scheduling conflicts with the constraints of HD-FDD wireless devices.

SUMMARY

It is therefore an object of embodiments herein to improve the performance in a wireless communications network by improving the scheduling of wireless devices in a system with at least one HD-FDD wireless device and at least one FD-FDD wireless device.

According to a first aspect of embodiments herein, the object is achieved by a method performed by a first network node for handling scheduling of one or more wireless devices. The first network node operates in a wireless communications network. The first network node obtains information about a first type of time resource. The first type of time resource is used by at least one wireless device of one or more HD-FDD wireless devices. The first network node also obtains information about a second type of time resource. The second type of time resource is not used by the one or more HD-FDD wireless devices due to a transition at the HD-FDD wireless devices between UL and DL time resources. The first network node schedules a first wireless device out of one or more FD-FDD wireless devices during the second type of time resource. This is done based on the obtained information about the second type of time resource. The first network node also decides whether or not to schedule a second wireless device out of the FD-FDD wireless devices during the first type of time resource. This is done based on the obtained information about the first type of time resource, and further based on whether one or more first conditions are met.

According to a second aspect of embodiments herein, the object is achieved by a method performed by a wireless device served by the first network node for performing one or more operations. The wireless device and the first network node operate in the wireless communications network. The one or more HD-FDD wireless devices and the one or more FD-FDD wireless devices operate in the wireless

TABLE 1

HD-FDD HARQ feedback example

| #0 (DL) | #1 (DL) | #2 (DL) | #3 (DL) | #4 (DL) | #5 (DL) | #6 (GP) | #7 (UL) | #8 (UL) | #9 (GP) |
|---------|---------|---------|---------|---------|---------|---------|---------|---------|---------|
| PSS SSS BCH | PHICH | PHICH | PDSCH | PDSCH | PSS SSS SIB | DL->UL | PUCCH PUSCH | PUCCH PUSCH | UL->DL |

According to the requirement in 3GPP TS 36.133, 'Requirements for support of radio resource management (Release 12)', a UE may, in every radio frame, assess the radio link quality, evaluated over the previous time period, against thresholds, Qout and Qin. This is normal operation for FD-FDD UEs; however, for HD-FDD UEs, which switch between DL and UL, this may become challenging. Therefore, it may be necessary for eNBs to ensure that at least communications network. The wireless device obtains information about the first type of time resource. The first type of time resource is used by at least one wireless device of the HD-FDD wireless devices. The wireless device obtains information about the second type of time resource. The second type of time resource is not used by the HD-FDD wireless devices due to transition at the HD-FDD wireless devices between UL and DL time resources. The wireless device performs one or more operations based on the obtained information about the first type and the second type of time resource. The operations are one or more of the following: a) adapting wireless device battery power based on the obtained information, b) performing one or more measurements on signals of one or more: cells operating on one or more non-serving carrier frequencies, and/or, RATs other than that of a serving RAT of the wireless device, and c) processing data.

According to a third aspect of embodiments herein, the object is achieved by the first network node for handling scheduling of one or more wireless devices. The first network node is configured to operate in the wireless communications network. The first network node is further configured to obtain information about the first type of time resource. The first type of time resource is configured to be used by the at least one wireless device of the one or more HD-FDD wireless devices. The first network node is configured to obtain information about the second type of time resource. The second type of time resource is configured to not be used by the one or more HD-FDD wireless devices. This is due to a transition at the HD-FDD wireless devices between UL and DL time resources. The first network node is further configured to schedule the first wireless device out of the one or more FD-FDD wireless devices during the second type of time resource. This is based on the obtained information about the second type of time resource. The first network node is also configured to decide whether or not to schedule a second wireless device out of the FD-FDD wireless devices during the first type of time resource. This is based on the obtained information about the first type of time resource, and further based on whether one or more first conditions are met.

According to a fourth aspect of embodiments herein, the object is achieved by the wireless device. The wireless device is configured to be served by the first network node for performing the one or more operations. The wireless device and the first network node are configured to operate in the wireless communications network. The one or more HD-FDD wireless devices, and one or more FD-FDD, wireless devices are configured to operate in the wireless communications network. The wireless device is configured to obtain information about the first type of time resource. The first type of time resource is configured to be used by the at least one wireless device of the HD-FDD wireless devices. The wireless device is further configured to obtain information about the second type of time resource. The second type of time resource is configured to not be used by the HD-FDD wireless devices due to transition at the HD-FDD wireless devices between UL and DL time resources. The wireless device is also configured to perform the one or more operations based on the obtained information about the first type and the second type of time resource. The operations are one or more of the following: a) to adapt wireless device battery power based on the obtained information, b) to perform one or more measurements on signals of one or more: cells operating on one or more non-serving carrier frequencies, and/or RATs other than that of a serving RAT of the wireless device, and c) to process data.

According to a fifth aspect of embodiments herein, the object is achieved by a computer program, comprising instructions which, when executed on at least one processor, cause the at least one processor to carry out the method performed by the first network node.

According to a sixth aspect of embodiments herein, the object is achieved by a computer-readable storage medium, having stored thereon the computer program, comprising instructions which, when executed on at least one processor, cause the at least one processor to carry out the method performed by the first network node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the first network node scheduling the first wireless device only of the FD-FDD, wireless devices during the at least one time resource of the second type of time resource, which is not for use, e.g. it is not used or it is not expected to be used, by the HD-FDD wireless devices, efficient usage of radio resources in a mixture of HD-FDD and FDD wireless devices in the same cell is enabled. Unused subframes due to transition between UL and DL subframes in HD-FDD wireless devices are more efficiently utilized by assigning them to FD-FDD wireless devices.

Further advantages of some embodiments disclosed herein are discussed below.

BRIEF DESCRIPTION OF THE DRAWINGS

Examples of embodiments herein are described in more detail with reference to attached drawings in which.

DETAILED DESCRIPTION

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 1:
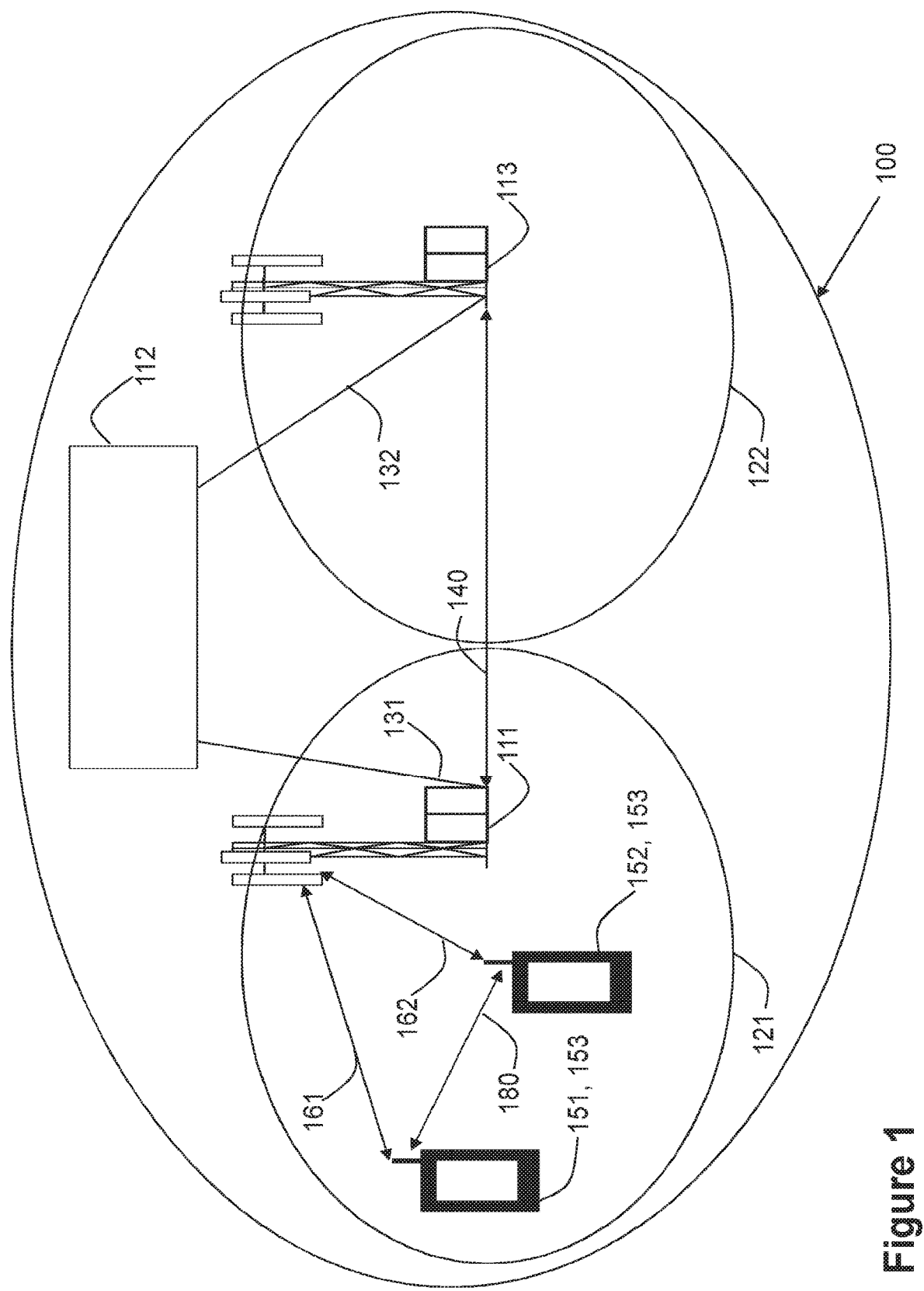
FIG. 1 is a schematic block diagram illustrating embodiments in a wireless communications network, according to embodiments herein.

FIG. 1 depicts a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, Global system for mobile communication (GSM) network, GSM Enhanced Data rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a first network node 111, a second network node 112, and a third network node 113. Each of the first network node 111 and the third network node 113 may be, for example, base stations such as e.g., an eNB, eNodeB, or a Home Node B, a Home eNode B, femto Base Station, BS, pico BS or any other network unit capable to serve a wireless device or a machine type communication device in a wireless communications network 100. In some particular embodiments, each of the first network node 111, and the third network node 113 may be a stationary relay node or a mobile relay node. In some particular embodiments, the third network node 113 may be neighbor to the first network node 111.

The wireless communications network 100 covers a geographical area which is divided into cell areas, wherein each cell area is served by a network node, although, one network node may serve one or several cells. In the non-limiting example depicted in FIG. 1, the network node 111 serves a first cell 121, and the third network node 113 serves a second cell 122. Each of the first network node 111 and the third network node 113 may be of different classes, such as, e.g., macro eNodeB, home eNodeB or pico base station, based on transmission power and thereby also cell size. Typically, the wireless communications network 100 may comprise more cells similar to the first cell 121 and the second cell 122, served by their respective network node. This is not depicted in FIG. 1 for the sake of simplicity. Each of the first network node 111, and the third network node 113 may support one or several communication technologies, and its name may depend on the technology and terminology used. In 3GPP LTE, the first network node 111 and the third network node 113, which may be referred to as eNodeBs or even eNBs, may be directly connected to one or more core networks.

The second network node 112 may communicate with the other network nodes, e.g., the first network node 111 and the third network node 113. For example, the second network node 112 may be a radio controller, e.g. a Radio Network Controller (RNC) or a Base station Controller (BSC), or a node in a core network, e.g., a Mobility Management Entity (MME). The network node 111 and the third network node 113 may communicate with the second network node 112 over a first link 131 and over a second link 132, respectively. The network node 111 may communicate with the third network node 113 over a third link 140.

A number of wireless devices are located in the wireless communications network 100. In the example scenario of FIG. 1, only two wireless devices are shown out of a mixture of wireless devices in the wireless communications network 100. The mixture of wireless devices comprises one or more HD-FDD wireless devices 151, also referred to herein as first wireless devices 151, which are represented in the Figure with one first wireless device 151 for the sake of simplicity. The mixture also comprises one or more FD-FDD wireless devices 152, also referred to herein as second wireless devices 152, which are represented in the Figure with one second wireless device 152 for the sake of simplicity. Any of the one or more HD-FDD wireless devices 151 and the one or more FD-FDD wireless devices 152 may be referred to herein simply as a wireless device 153, unless otherwise specified. Each of the first wireless devices 151 and the second wireless devices 152 is a wireless communication device such as a UE, which is also known as e.g., mobile terminal, wireless terminal, mobile station, mobile telephone, and/or cellular telephone. Any reference herein to a UE is understood to also refer to a wireless device. Further examples of different wireless devices include laptops with wireless capability, modems, Personal Digital Assistants (PDA), or tablet computers, sometimes referred to as a surf plates with wireless capability, Machine-to-Machine (M2M) devices, devices equipped with a wireless interface, such as a printer or a file storage device, Machine Type Communication (MTC) devices such as sensors, just to mention some examples. Each of the devices is wireless, i.e., it is enabled to communicate, e.g., voice and/or data, wirelessly in the wireless communications network 100. The communication may be performed e.g., between two devices, such as between the one of the first wireless device 151 and one of the one of the second wireless devices 152, as described above, between a device and a regular telephone and/or between a device and another entity, such as a server or any other radio network unit capable of communicating over a radio link in the wireless communications network 100. The communication may be performed e.g., via a RAN and possibly the one or more core networks comprised within the wireless communications network 100.

It is noted that any reference herein to the first wireless devices 151 is understood to comprise a reference to one or more first wireless devices 151, unless noted otherwise. It is noted that any reference herein to the second wireless devices 152 is understood to comprise a reference to one or more first wireless devices 152, unless noted otherwise.

The first wireless devices 151 are located within the cell 121. The first wireless devices 151 are configured to communicate within the wireless communications system 100 via the first network node 111 over a first radio link 161 when the first wireless devices 151 are present in the cell 121 served by the first network node 111.

In this example, the second wireless devices 152 are also located within the cell 121. However, in other embodiments, the second wireless devices 152 may be located within the radio coverage of the first wireless devices 151, in another cell. When the second wireless devices 152 are present in the cell 121, they are configured to communicate within the wireless communications network 100 via the first network node 111 over a radio link such as e.g. a second radio link 162. When the second wireless devices 152 are present in another cell, e.g., cell 122, they are configured to communicate within the wireless communications network 100 via another network node serving the another cell, such as the third network node 113 over another radio link similar the second radio link 162.

The first wireless devices 151 may be capable of communicating with other wireless devices, such as the second wireless devices 152, using wireless Device-to-Device (D2D) communication over a D2D link 180. The second wireless devices 152 may be capable of communicating with other wireless devices, such as the first wireless device 151, using wireless D2D communication over a D2D link such as the D2D link 180, in the case of the first wireless devices 151, or a similar D2D link.

In the description herein "a wireless device 151, 152, 153" or "the wireless device 151, 152, 153" refers to any wireless device of the first wireless devices 151 and the second wireless devices 152, unless noted otherwise.

Several embodiments are comprised herein. Embodiments herein may be related to methods implemented in a network node and a UE, also referred to herein as a wireless device.

According to the foregoing description of the wireless communications network 100, embodiments herein may be understood, in other words, to relate to a scenario with a mixture of HD-FDD and FD-FDD UEs. UEs are also referred to herein as wireless devices.

Description of a Scenario with a Mixture of HD-FDD and FD-FDD UEs

The scenario may comprise at least a first network node 111 and a HD-FDD UE, such as the first wireless devices 151, and a FD-FDD UE, such as the second wireless devices 152. The scenario may further comprise of one or more network nodes: a second radio node, such as the second network node 112 and a third network node, such as the third network node 113. Any reference herein to a second network node is understood to apply to the second network node 112. Any reference herein to a third network node is understood to apply to the third network node 113.

The first network node may be capable of serving a mixture of HD-FDD UEs and FD-FDD UEs in the UL and/or in the DL radio resources in a first cell, such as the first cell 121. The HD-FDD UEs and FD-FDD UEs may therefore be served by the first cell, which may be in turn served or be managed by the first network node. The first network node may be capable of operating in FD-FDD operational mode. The third network node may serve a second cell, which may be a neighboring cell of the first cell; but they may or may not be geographically adjacent to each other.

The scenario may further comprise that the second network node may communicate with the other network node or nodes, e.g., first and third network nodes. For example, the second network node may be a radio controller, e.g., RNC or BSC, or a node in a core network, e.g., MME. The UE may further communicate with the second network node and/or third network node. In some embodiments the first and the second network nodes are the same e.g. eNode B in LTE.

A generic term 'time resource' is used hereinafter. A time resource may be a subset of time unit within a radio frame. Typically, it may be a subframe, which is 1 ms in LTE; but it may also be a time slot, symbol, group of time slot or subframes, TTI etc.

In general terms, embodiments herein may be understood to relate to a method in a network node of determining and using time resources for scheduling a mixture of HD-FDD and FD-FDD UEs. Any reference herein to "using" may be understood as "performing" an act, i.e., an operation, "based on" what it used. Thus, "using time resources for scheduling a mixture of HD-FDD and FD-FDD UEs" may be understood as "performing scheduling of a mixture of HD-FDD and FD-FDD UEs, based on time resources". Embodiments herein may also be understood, in general, as referring to a method in a node of using the information obtained about time resources used for scheduling a mixture of HD-FDD and FD-FDD UEs in a first network node such as the first network node 111. Any reference herein to a first network node is understood to apply to the first network node 111.

Embodiments of a method performed by the first network node 111 for handling scheduling of the one or more wireless devices, will now be described with reference to the flowchart depicted depicted in FIG. 2. As stated earlier the first network node 111 operates in the wireless communications network 100.

The method may comprise the following actions, which actions may as well be carried out in another suitable order than that described below. In some embodiments, the first network node 111 may perform all actions, whereas in other embodiments, some actions may be performed. The optional actions are indicated.

Action 201

Due to the nature of how the HD-FDD wireless devices operate, there are time resources which are not used or are not expected to be used by a HD-FDD wireless device due to transition between an UL and a DL time resource. This type of time resources are also called unused time resources since in such time resources, a HD-FDD wireless device cannot be served or scheduled.

In order to more efficiently use time resources for scheduling wireless devices, the first network node 111 may take advantage of these time resources unused by the HD-FDD wireless devices 151, to schedule in them the FD-FDD wireless devices 152, in for example, the described scenario of the mixture of the one or more HD-FDD wireless devices 151 and the one or more FD-FDD wireless devices 152.

Thus, before scheduling the one or more FD-FDD wireless devices 152, the first network node 111 may obtain information, e.g., a pattern, about time resources of different types. Each type may be related to whether they are used, or not, or whether they are to be used, or not, by the one or more HD-FDD wireless devices 151. According to this, there may be three types of time resource:

A first type of time resource is used by at least one wireless device of one or more Half Duplex-Frequency Division Duplex, HD-FDD wireless devices 151 operating in the wireless communications network 100.

A second type of time resource is not used by the one or more HD-FDD wireless devices 151 due to a transition at the HD-FDD wireless devices 151 between UpLink, UL, and DownLink, DL, time resources, due to a transition at the HD-FDD wireless devices 151 between UpLink, UL, and DownLink, DL, time resources.

In some embodiments, there may be a third type of time resource, which is any time resource other than the first and the second types of time resources.

As explained earlier, the time resource may be one of a: symbol, time slot, subframe, Transmission Time Interval, TTI, and interleaving time. In some embodiments, the first type of time resource may be one or more of: DL subframe 0, DL subframe 5 or UL subframe configured to transmit a reference signal.

According to the foregoing, in this action, the first network node 111 obtains information about the first type of time resource. As will be further explained later, the obtained information about the first type of time resource may comprise a pattern of at least one time resource of one or more of: the first type of time resource, the second type of time resource and the third type of time resource. The information may further comprise an identifier, e.g., subframe numbers, of every type of time resource, that is, of the first type of time resource, the second type of time resource and the third type of time resource. The information may even further comprise a maximum amount of traffic load, e.g., maximum number of UEs, bit rate etc . . . , that may be handled or served over a time e.g., in a frame or group of frames, by the first type of time resource, the second type of time resource and the third type of time resource.

The obtaining information about any of the first, second and third types of time resource may comprise one or more of: a) autonomously determining the information, b) receiving the information from the second network node 112 operating in the wireless communications network 100, c) receiving the information from another wireless device, and d) reading pre-defined or stored information.

In some embodiments, the network node 111 may apply an additional rule or restriction to define a subset of resources, to make them relevant, e.g., for a specific measurement. This may be implemented as a rule/guidance for obtaining, e.g., "if the resources to be obtained are for <a specific measurement>, then only subframe X and/or subframe Y are relevant" where, depending on the exact criteria, either at least one or both of X and Y may need to be available. Accordingly, the obtaining information may comprise selecting one or more types of time resources of the first, second and third type based on one or more of the following criteria:

a. type of radio measurements to be performed by the at least one wireless device of the one or more HD-FDD wireless devices 151. For example RSRP and RSRQ may require any subframe containing CRS. But cell search may require DL subframe 0 and/or DL subframe 5. CGI acquisition may require both DL subframe 0 and DL subframe 5 as well;

b. type of base station radio measurements performed on signals transmitted by the at least one wireless device of the one or more HD-FDD wireless devices 151. For example, a eNode B, such as the first network node 111, Rx-Tx time difference may require that the UE transmits SRS in certain UL subframes every N frames, e.g., N may be 2 or 4;

c. number of time resources needed for wireless device radio measurements performed by the at least one wireless device of the one or more HD-FDD wireless devices 151. For example, RSRP and RSRQ may require typically 2 DL subframes every N frames, e.g. N may be 2 or 4;

d. number of time resources needed for base station radio measurements on signals transmitted by the at least one wireless device of the one or more HD-FDD wireless devices 151. For example, the eNode B Rx-Tx time difference may require that the UE transmits SRS in certain UL subframes every N frames, e.g. N may be 2 or 4;

e. time synchronization level between cells on which the at least one wireless device of the one or more HD-FDD wireless devices 151 performs measurements. For example, if the cells are frame synchronized, then all UL and DL subframes between cells are aligned within a margin, e.g., ±3 μs. In this case, the DL and UL subframes used by the UE for doing measurements in serving and neighboring cells may also be time aligned. But if the frames between cells are not aligned, then network node may have to ensure that subframes needed for doing measurements in serving and neighboring cells are available at the HD-FDD UE;

f. UL resources needed for enabling a wireless device served by the first network node 111 to send a measurement report to the first network node 111. This may apply to any wireless devices served by any network node that has different types of wireless devices/resources. The UL resources may not be less frequent than the needed/configured reporting periodicity. Therefore, the type of subframe to select may take into account UL resources that may be needed for enabling the UE to send measurement reports to the network node;

g. Discontinuous Reception, DRX/Discontinuous Transmission, DTX, configuration of wireless devices in the first cell 121 served by the first network node 111. If the UE is in DRX, then the network node may allocate limited first type of subframes, since UE uses them infrequently in DRX.

Alternatively, the selection according to the criteria just described may be performed after or in the end of the obtaining action 201, or any of actions 202 and 203, described below.

Action 202

In this action, the first network node 111 obtains information about a second type of time resource.

The obtaining information about the second type of time resource may be implemented as described above for obtaining information about the first type of time resource.

Action 203

In this action, the first network node 111 may obtain information about the third type of time resource. This action is optional.

The obtaining information about the third type of time resource may be implemented as described above for obtaining information about the first type of time resource.

The obtained information about any of the first type, second type and third type of time resource may comprise a pattern of at least one time resource of one or more of: the first type of time resource, the second type of time resource and the third type of time resource.

Action 204

Once the information about the first and second types of time resource, and in some embodiments also of the third type of time resource, has been obtained, the first network node 111 may be in a better position to more efficiently use the time resources to schedule the one or more FD-FDD wireless devices 152. That is, the first network node 111 may schedule FD-FDD wireless devices 152 in time resources that may not be used by the HD-HDD wireless devices 151 due to a transition between UL and DL resources.

Thus, in this action, the first network node 111 schedules a first wireless device out of the one or more FD-FDD wireless devices 152 during the second type of time resource, based on the obtained information about the second type of time resource. This may ensure that these time resources, which are not used by the HD-FDD wireless devices 151, are instead used by the FD-FDD wireless devices 152.

Action 205

Under some conditions, it may be a more efficient use of time resources to also schedule FD-FDD wireless devices 152 in time resources that are used by the HD-HDD wireless devices 151. This may be done to increase the number of wireless devices sharing the same resources on average.

Thus, in this action, the first network node 111 decides whether or not to schedule a second wireless device out of the FD-FDD wireless devices 152 during the first type of time resource, based on the obtained information about the first type of time resource, and further based on whether one or more first conditions are met.

The one or more first conditions may comprise at least one of:
 a. the number of the HD-FDD wireless devices 151 in the first cell 121 served by the first network node 111 is below a first threshold. Herein, threshold is understood to correspond to a value set for example by an operator of the wireless communications network 100;
 b. the number of the HD-FDD wireless devices 151 scheduled or to be scheduled during the first type of time resource is below a second threshold;
 c. a signal quality during the first type of time resource is above a third threshold.

In some embodiments, the scheduling by the first network node 111 in action 204 further comprises scheduling a third wireless device out of the FD-FDD wireless devices 152 during the third type of time resource provided one or more second conditions are met. That is, if the number of FD-FDD wireless devices in the cell is below a threshold e.g., 50 for cell bandwidth of 10 MHz or more, then the network may preferably use third type of time resources for scheduling FD-FDD wireless devices. In this way, some of the resources used for scheduling HD-FDD and FD-FDD wireless devices may be kept orthogonal, i.e., different for these two kinds of wireless devices. This may ensure better interference management.

The one or more second conditions may comprise one or more of:
 a. the number of the FD-FDD wireless devices 152 is below a fourth threshold in the first cell 121 served by the first network node 111;
 b. the number of FD-FDD wireless devices 152 scheduled or expected to be scheduled during the third type of time resource is below a fifth threshold; and
 c. a signaling quality during the third type of time resource is above a sixth threshold.

Action 206

In this action, the first network node 111 may send the obtained information about any of the first, second and third types of time resource to at least one of: the third network node 113 operating in the wireless communications network 100, and one or more of the HD-FDD and/or FD-FDD wireless devices 151, 152. This action is optional.

The obtained information may then be used by the recipient network node or wireless device to perform one or more actions, taking advantage of the knowledge provided by the sent information. For example, a HD-FDD UE may turn off its battery during unused subframes or during subframes which are used only for FD-FDD, as will be described later.

The information may be transmitted in the form of a pattern of resources tagged by their pre-defined identifiers. For example ID 0, 1 and 2 may represent first, second and third type of time resources. The pattern may be repeated over a radio frame or over a group of frames such as L number of radio frames e.g. L=4. A pattern may also be signalled for one radio frame or group of frames and they may apply also for all subsequent frames or group of frames, unless new pattern is signaled. The pattern may also be associated with timing information, e.g., reference starting time of the pattern such as System Frame Number (SFN)=0. This may allow the receiving node to know when the received pattern starts in the transmitting network node.

In other words, Actions 201-206 may be viewed as relating to a method in network node of determining and using time resources for scheduling mixture of HD-FDD and FD-FDD UEs, the method comprising:

Obtaining Information

Through actions 201-203, the network node, which may be a first network node, or a second network node, may obtain at least the following information about different types of time resources:
 At least information about one first type of time resource, which is used or expected to be used or may be used by a HD-FDD UE for doing measurement and/or scheduling data. The first type of time resource(s) may be UE specific or may be an aggregate set of time resources for all HD-FDD UEs in a cell or for a group of HD-FDD UEs in the cell. This corresponds to Action 201;
 At least information about one second type of time resource, which is not used or is not expected to be used by a HD-FDD UE due to transition at the HD-FDD UE between an UL and DL time resources. This type of time resource is also called unused time resource due to the UL-to-DL or DL-to-UL transition i.e. it is destroyed or lost at the HD-FDD UE due to the transition. In such time resource, e.g., a subframe, a HD-FDD UE may not be served or scheduled. The unused time resource may lie between any two successive UL and DL time resources which are available at the HD-FDD UE for scheduling data and/or doing measurement. The second type of time resource(s) may be UE specific or may be an aggregate set of time resources for all HD-FDD UEs in a cell or for a group of HD-FDD UEs in the cell. This corresponds to Action 202;

The network node may further obtain the following information about:
 At least information about one third type of time resource which is any time resource other than the first and the second types of time resources. This corresponds to Action 203.

Figure 3:
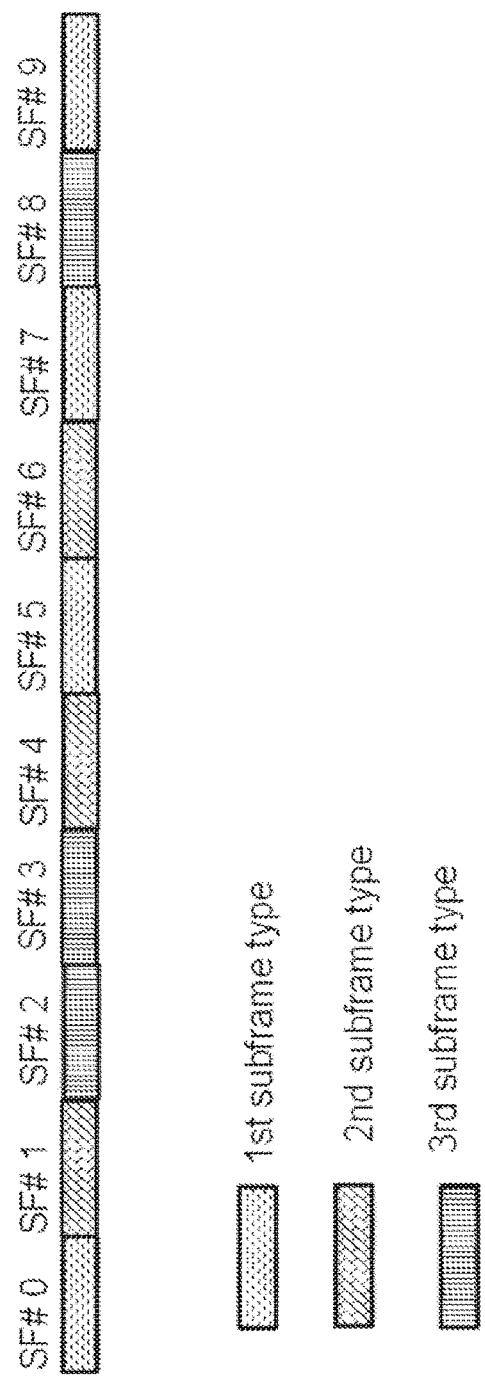
FIG. 3 is a schematic diagram illustrating embodiments of the first, second and third types of time resource as subframes in a radio frame, according to embodiments herein.

FIG. 3 shows an example of the first, second and third types of time resource, in an embodiment wherein the time resource is a subframe/s in a radio frame.

If the second network node obtains, e.g., determines, any one or more of the above set of information then it may signal them to the first network node. The first network node may eventually use this for scheduling HD-FDD and FD-FDD UEs as elaborated in the section entitled "Using the obtained information for scheduling, i.e., performing scheduling based on the obtained information".

The time resource may be used by the UE for reception and/or transmission of radio signals for the purpose of one or more of: scheduling data or transmitting, such as random access transmission in the UL, and/or higher layer signaling, performing radio measurements etc. Any of the time resource may be in UL or DL i.e. UL subframe or DL subframe.

Criteria Used for Obtaining Different Types of Time Resources

As described above in relation to Action 201, the network node, that is, the first or second network node, may use one or more of the following criteria for selecting one or more for the first and the second type of time resources:
 Type of radio measurements performed by a HD-FDD UE.
 Type of base station radio measurements performed on signals transmitted by a HD-FDD UE.
 Number of time resources needed for UE radio measurements performed by a HD-FDD UE.

Number of time resources needed for base station radio measurements on signals transmitted by a HD-FDD UE.

Time synchronization level between cells on which a HD-FDD UE performs measurements.

Measurement reporting configuration.

UE DRX/DTX configuration.

Using the Obtained Information for Scheduling, i.e., Performing Scheduling Based on the Obtained Information Through Actions 204 and 205, the first network node may use the obtained information related to different types of subframes determined in Actions 201-203 for scheduling HD-FDD and FD-FDD UEs according to one or more of the following principles.

The FD-FDD UEs may be scheduled during the second type of time resources. This may ensure that these time resources, which are not used by HD-FDD UEs, are instead used by FD-FDD UEs. This corresponds to Action 204.

The HD-FDD UEs may be scheduled during the first type of time resources, i.e., during the subframes which are made available at the UE for doing radio measurements in UL and/or DL. This may be done to avoid the need for having separate time resources for radio measurements and for scheduling of data in case of HD-FDD UEs.

The FD-FDD UEs may or may not be scheduled in the first type of time resources depending upon whether one or more first conditions are met. This corresponds to Action 205. For example the FD-FDD UEs may also be selectively scheduled in first type of time resources provided one or more first conditions are met. This is to limit the number of UEs from sharing the same resources. Examples of scenarios when a first condition is met are:

Number of HD-FDD UEs in a cell is below a threshold;

Number of HD-FDD UEs served or scheduled or which will be scheduled in the first type of time resource is below a threshold;

Signal quality in the first time resource is above a threshold, e.g., SINR or SNR is above a threshold;

Number of FD-FDD UEs served or scheduled or which will be scheduled in the first type of time resource is below a threshold;

Number of FD-FDD UEs in a cell is above a threshold;

Amount of data in buffer for FD-FDD UEs is above a threshold.

The FD-FDD UEs may or may not be scheduled in third type of time resources depending upon whether one or more second conditions are met. This corresponds to particular embodiments of Action 204. For example the FD-FDD UEs may also be selectively scheduled in third type of time resources provided one or more second conditions are met. Examples of scenarios when a second condition is met are:

Number of FD-FDD UEs in a cell is below a threshold;

Number of FD-FDD UEs served or scheduled or will be scheduled in the third type of time resource is below a threshold;

Signal quality in the third time resource is above a threshold.

Transmitting the Obtained Information to Other Nodes

The network node (first network node or second network node) may also transmit the obtained information about any one or more of the: first type, second type and third type of time resources to other nodes. This corresponds to Action 206.

Examples of other nodes which may receive the information are:

Third network node e.g. neighboring network node such as a neighboring eNode B

UE

The above nodes may use the received information for different tasks as described in the section entitled "Method in a node of using the information about time resources used for scheduling mixture of HD-FDD and FD-FDD UEs in first network node".

Embodiments herein are applicable to single carrier as well as to multicarrier or Carrier Aggregation (CA) operation of the UE, in which the UE is able to receive and/or transmit data to more than one serving cell. The term Carrier Aggregation (CA) is also called, e.g. interchangeably called, "multi-carrier system", "multi-cell operation", "multi-carrier operation", "multi-carrier" transmission and/or reception. In CA, one of the Component Carriers (CCs) is the Primary Component Carrier (PCC), or simply primary carrier, or even anchor carrier. The remaining ones are called Secondary Component Carriers (SCC), or simply secondary carriers, or even supplementary carriers. The serving cell is interchangeably called as primary cell (PCellI) or primary serving cell (PSC). Similarly, the secondary serving cell is interchangeably called as Secondary Cell (SCell) or Secondary Serving Cell (SSC).

Figure 4:
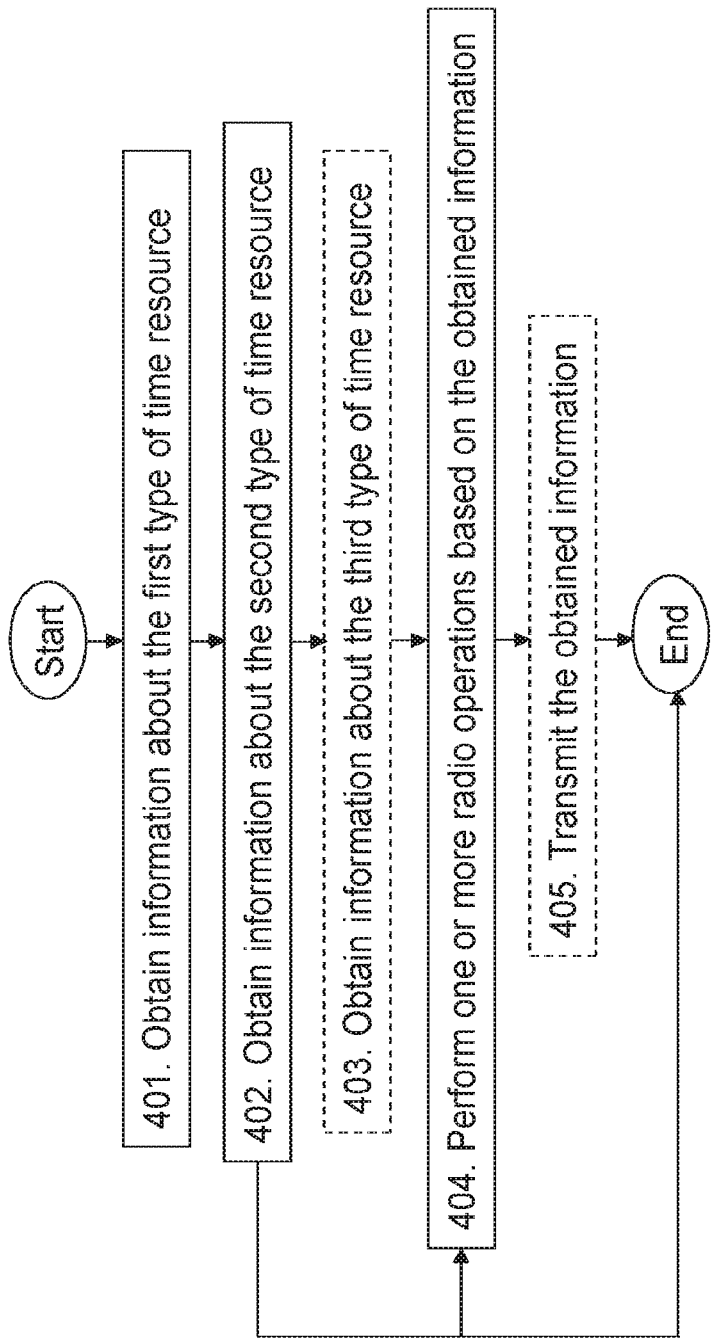
FIG. 4 is a flowchart depicting embodiments of a method in a wireless device, according to embodiments herein.

Embodiments of a method performed by the wireless device 151, 152, 153 served by the first network node 111 for performing one or more operations, will now be described with reference to the flowchart depicted depicted in FIG. 4. As stated earlier the wireless device 151, 152, 153 and the first network node 111 operate in the wireless communications network 100. The one or more HD-FDD wireless devices 151, and the one or more FD-FDD wireless devices 152 operate in the wireless communications network 100.

The method may comprise the following actions, which actions may as well be carried out in another suitable order than that described below. In some embodiments, the wireless device 151, 152, 153 may perform all actions, whereas in other embodiments, some actions may be performed. The optional actions are indicated.

Action 401

The information about any of the first, second and third types of time resource, as described above, may also be used by the wireless device 151, 152, 153, to perform one or more operations, e.g., radio operations, based on the obtained information, taking advantage of the knowledge provided by this information. For example, a HD-FDD UE may turn off its battery during unused subframes or during subframes which are used only for FD-FDD. Accordingly, first, in this action, the wireless device 151, 152, 153 obtains the information about the first type of time resource, wherein the first type of time resource is used by at least one wireless device of the HD-FDD wireless devices 151.

The information may be obtained by one or more of a. autonomously determining the information, b. receiving information from the first network node 111, c. receiving information from the second network node 112 operating in the wireless communications network 100, d. receiving from another wireless device, and e. reading pre-defined or stored information.

Action 402

In this action, the wireless device 151, 152, 153 obtains information about the second type of time resource, wherein the second type of time resource is not used by the HD-FDD wireless devices 151 due to transition at the HD-FDD wireless devices 151 between UpLink, UL, and DownLink, DL, time resources.

The obtaining information about the second type of time resource may be implemented as described in action 401 for obtaining information about the first type of time resource.

Action 403

In this action, the wireless device 151, 152, 153 obtains information about the third type of time resource, which is any time resource other than the first and the second types of time resources.

The obtaining information about the third type of time resource may be implemented as described in action 401 for obtaining information about the first type of time resource.

As described before, the obtained information about any of the first type, second type and third type of time resource may comprise a pattern of at least one time resource of one or more of: the first type of time resource, the second type of time resource and the third type of time resource.

Action 404

In this action, the wireless device 151, 152, 153 performs one or more operations based on the obtained information about the first type and the second type of time resource. The operations are one or more of the following:
a. adapting wireless device battery power based on the obtained information. For example, the wireless device 151, 152, 153 may turn off its battery during the second type of time resource and therefore save its power and extend the battery life;
b. performing one or more measurements on signals of one or more: cells operating on one or more non-serving carrier frequencies, and/or RATs other than that of a serving RAT of the wireless device 151, 152, 153. For example, the wireless device 151, 152, 153 may perform measurements only during the first type of radio resource. This is because during the first type of time resource the wireless device 151, 152, 153 may receive or transmit signals; and
c. processing data. For example, the wireless device 151, 152, 153 may process data during the second type of time resource. This is because during this time, the wireless device 151, 152, 153 may not be scheduled or may not perform any radio measurement.

Action 405

In this action, the wireless device 151, 152, 153 may transmit the obtained information to other nodes operating in the wireless communications network 100, such as at least one of: another wireless device 151, 152, a second network node 112, a third network node 113, and another node. This action is optional.

In other words, Actions 401-405 may be viewed as relating to a method in a node of using the information about time resources used for scheduling a mixture of HD-FDD and FD-FDD UEs in the first network node. In Actions 401-405, the node is a wireless device or UE. In alternative embodiments of this method, the node may be, e.g., the third network node 113. The node, may use the information about time resources used for scheduling the mixture of HD-FDD and FD-FDD UEs in first network node, for one or more operational tasks or actions. This corresponds to Action 404.

Examples of such tasks which may be performed by the UE are:
Storing the pattern and using it at a future time;
Adapting UE battery power or a UE activity/inactivity periods configuration based on the obtained information, e.g. the pattern;
HD-FDD UE may process previously received data during unused subframes;
Transmitting the pattern to other nodes e.g. UE and/or second network node and/or third network node.

Examples of such tasks which may be performed by the third network node are:
Storing the pattern and using it at a future time;
Using the pattern for adapting its own pattern of time resources for scheduling FD-FDD and/or HD-FDD UEs.
Using the pattern information for mitigating interference e.g. scheduling fewer UEs in a time resource, e.g., DL subframe 3, whose corresponding time resource, e.g., also subframe 3 assuming nodes are frame aligned, is used for scheduling large number of UEs or for mixture of FD-HDD and HD-FDD UEs.
Transmitting the pattern to other nodes e.g. the second network node.
Using the pattern for adapting the UE activity/inactivity periods configuration, e.g., DRX, to the pattern.

An advantage of embodiments disclosed herein is that the disclosed methods enable an efficient use of radio resources in a mixture of HD-FDD and FDD UEs in the same cell. For example, unused subframes due to transition between UL and DL subframes in HD-FDD are more efficiently utilized by assigning them to FDD UEs.

Another advantage of embodiments disclosed herein is that the interference in certain subframes used for measurements by the HD-FDD UEs is reduced by avoiding scheduling of FDD UEs. This in turn enhances the performance of measurements for HD-FDD UEs.

To perform the method actions described above in relation to FIG. 2 by the first network node 111 is configured to handle scheduling of one or more wireless devices. The first network node 111 may comprise the following arrangement depicted in FIG. 5. As already mentioned, the first network node 111 is configured to operate in the wireless communications network 100.

The detailed description of some of the following corresponds to the same references provided above, in relation to the actions described for the first network node 111, and will thus not be repeated here.

The first network node 111 is further configured to, e.g., by means of an obtaining module 501 configured to, obtain information about the first type of time resource, wherein the first type of time resource is configured to be used by the at least one wireless device of the one or more HD-FDD wireless devices 151.

The obtaining module 501 may be a processor 505 of the first network node 111, or an application running on such processor.

The first network node 111 is further configured to, e.g., by means of the obtaining module 501 configured to, obtain information about the second type of time resource, wherein the second type of time resource is configured to not be used by the one or more HD-FDD wireless devices 151 due to a transition at the HD-FDD wireless devices 151 between UL and DL time resources.

The first network node 111 may be further configured to, e.g., by means of the obtaining module 501 configured to, obtain information about the third type of time resource, which is any time resource other than the first and the second types of time resources.

To obtain information about any of the first, second and third types of time resource may comprise one or more of:
a. to autonomously determine the information, b. to receive the information from the second network node 112 configured to operate in the wireless communications network 100;

c. to receive the information from another wireless device, and d. to read pre-defined or stored information.

In some embodiments, to obtain information comprises to select one or more types of time resources of the first, second and third type based on one or more of the following criteria:

a. the type of radio measurements to be performed by the at least one wireless device of the one or more HD-FDD wireless devices 151, b. the type of base station radio measurements performed on signals transmitted by the at least one wireless device of the one or more HD-FDD wireless devices 151;

c. the number of time resources needed for wireless device radio measurements performed by the at least one wireless device of the one or more HD-FDD wireless devices 151;

d. the number of time resources needed for base station radio measurements on signals transmitted by the at least one wireless device of the one or more HD-FDD wireless devices 151;

e. the time synchronization level between cells on which the at least one wireless device of the one or more HD-FDD wireless devices 151 performs measurements;

f. the UL resources needed for enabling a wireless device served by the first network node 111 to send a measurement report to the first network node 111;

g. the DRX/DTX, configuration of wireless devices in the first cell 121 served by the first network node 111.

In some embodiments, the obtained information about any of the first type, second type and third type of time resource comprises the pattern of at least one time resource of one or more of: the first type of time resource, the second type of time resource and the third type of time resource.

The time resource may be one of a: symbol, time slot, subframe, TTI, and interleaving time.

In some embodiments, the first type of time resource is one or more of: a DL subframe 0, a DL subframe 5 or an UL subframe configured to transmit a reference signal.

The first network node 111 is further configured to, e.g., by means of a scheduling module 502 configured to, schedule the first wireless device out of the one or more FD-FDD wireless devices 152 during the second type of time resource, based on the obtained information about the second type of time resource.

The scheduling module 503 may be the processor 505 of the first network node 111, or an application running on such processor.

In some embodiments, to schedule further comprises to schedule the third wireless device out of the FD-FDD wireless devices 152 during the third type of time resource provided one or more second conditions are met.

The one or more second conditions may comprise one or more of:

a. the number of the FD-FDD wireless devices 152 is below the fourth threshold in the first cell 121 served by the first network node 111;

b. the number of FD-FDD wireless devices 152 scheduled or expected to be scheduled during the third type of time resource is below the fifth threshold; and c. the signaling quality during the third type of time resource is above the sixth threshold.

The first network node 111 is further configured to, e.g., by means of a deciding module 503 configured to, decide whether or not to schedule the second wireless device out of the FD-FDD wireless devices 152 during the first type of time resource, based on the obtained information about the first type of time resource, and further based on whether the one or more first conditions are met.

The deciding module 503 may be the processor 505 of the first network node 111, or an application running on such processor.

The one or more first conditions may comprise at least one of:

a. the number of the HD-FDD wireless devices 151 in the first cell 121 served by the first network node 111 is below the first threshold;

b. the number of the HD-FDD wireless devices 151 scheduled or to be scheduled during the first type of time resource is below the second threshold;

c. the signal quality during the first type of time resource is above the third threshold.

The first network node 111 may be further configured to, e.g., by means of a sending module 504 configured to, send the obtained information about any of the first, second and third types of time resource to at least one of: the third network node 113 configured to operate in the wireless communications network 100, and one or more of the HD-FDD and/or FD-FDD wireless devices 151, 152.

The sending module 504 may be the processor 505 of the first network node 111, or an application running on such processor.

To perform the method actions described above in relation to FIG. 4, the wireless device 151, 152, 153 is configured to be served by the first network node 111 for performing one or more operations. The wireless device 151, 152, 153 may comprise the following arrangement depicted in FIG. 6. As already mentioned, the wireless device 151, 152, 153 and the first network node 111 are configured to operate in the wireless communications network 100. The one or more HD-FDD wireless devices 151, and the one or more FD-FDD wireless devices 152 are configured to operate in the wireless communications network 100.

The detailed description of some of the following corresponds to the same references provided above, in relation to the actions described for the wireless device 151, 152, 153, and will thus not be repeated here.

The wireless device 151, 152, 153 is further configured to, e.g., by means of an obtaining module 601 configured to, obtain the information about the first type of time resource, wherein the first type of time resource is configured to be used by the at least one wireless device of the HD-FDD wireless devices 151.

The obtaining module 601 may be a processor 604 of the wireless device 151, 152, 153, or an application running on such processor.

The wireless device 151, 152, 153 is further configured to, e.g., by means of the obtaining module 601 configured to, obtain the information about the second type of time resource, wherein the second type of time resource is configured to not be used by the HD-FDD wireless devices 151 due to transition at the HD-FDD wireless devices 151 between UL and DL time resources.

The wireless device 151, 152, 153 may be further configured to, e.g., by means of the obtaining module 601 configured to, obtain the information about the third type of time resource, which is any time resource other than the first and the second types of time resources.

In some embodiments, the information is configured to be obtained by one or more of:
 a. autonomously determining the information,
 b. receiving information from the first network node 111,
 c. receiving information from the second network node 112 configured to operate in the wireless communications network 100,
 d. receiving from another wireless device, and
 e. reading pre-defined or stored information.

The obtained information about any of the first type, second type and third type of time resource may comprise the pattern of at least one time resource of one or more of the first type of time resource, the second type of time resource and the third type of time resource.

The wireless device 151, 152, 153 is further configured to, e.g., by means of a performing module 602, perform one or more operations based on the obtained information about the first type and the second type of time resource wherein the operations are one or more of the following:
 a. to adapt wireless device battery power based on the obtained information,
 b. to perform one or more measurements on signals of one or more: cells operating on one or more non-serving carrier frequencies, and/or RATs other than that of a serving RAT of the wireless device 151, 152, 153, and
 c. to process data.

The performing module 602 may be the processor 604 of the wireless device 151, 152, 153, or an application running on such processor.

The wireless device 151, 152, 153 may be further configured to, e.g., by means of a transmitting module 603, transmit the obtained information to other nodes operating in the wireless communications network 100, such as at least one of: another wireless device 151, 152, the second network node 112, the third network node 113, and another node.

The transmitting module 603 may be the processor 604 of the wireless device 151, 152, 153, or an application running on such processor.

Figure 5:
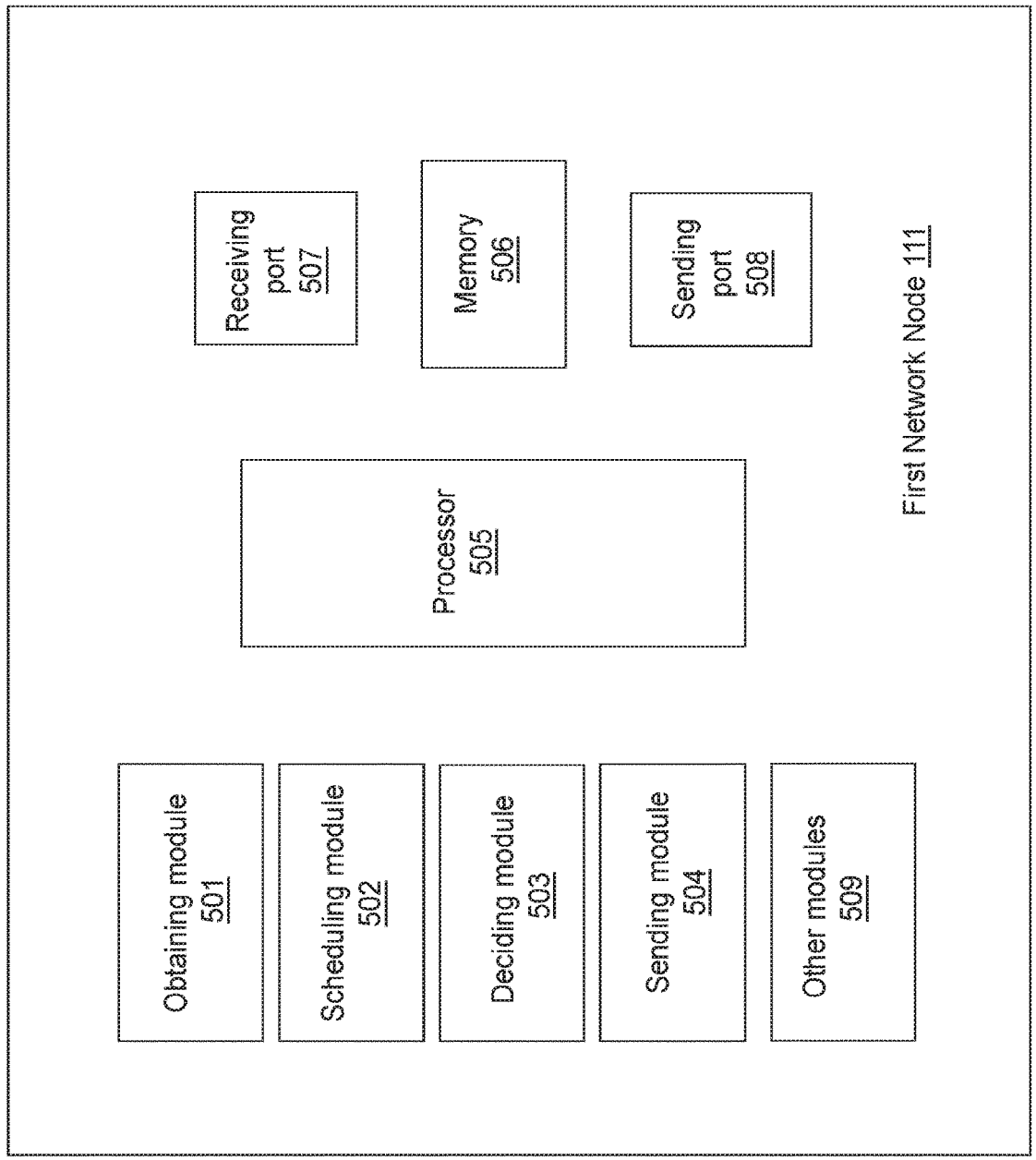
FIG. 5 is a schematic block diagram illustrating embodiments of a first network node, according to embodiments herein.
Figure 6:
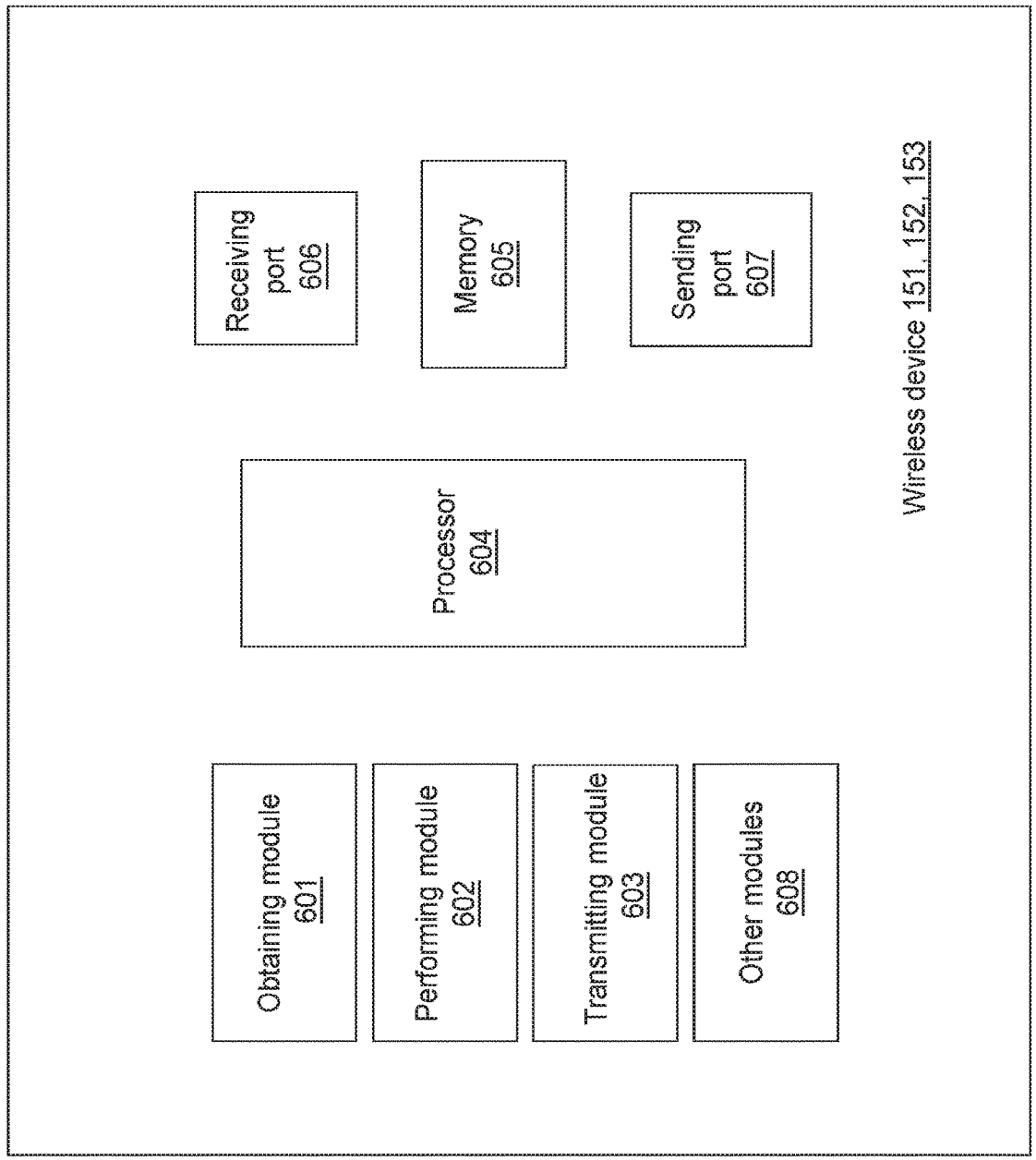
FIG. 6 is a schematic block diagram illustrating embodiments of a wireless device, according to embodiments herein.

The embodiments herein may be implemented through one or more processors, such as the processor 505 in the first network node 111 depicted in FIG. 5, and the processor 604 in the wireless device 151, 152, 153 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first network node 111 or the wireless device 151, 152, 153. One such carrier may be in the form of a CD ROM disc. It is however feasible with other data carriers such as a memory stick. The computer program code may furthermore be provided as pure program code on a server and downloaded to the first network node 111 or the wireless device 151, 152, 153.

The first network node 111 and the wireless device 151, 152, 153 may further comprise a memory 506, 605, respectively, comprising one or more memory units. The memory 506, 605 is arranged to be used to store obtained information, store data, configurations, schedulings, and applications etc. to perform the methods herein when being executed in the first network node 111 or the wireless device 151, 152, 153.

In some embodiments, information may be received by the first network node 111 and the wireless device 151, 152, 153, respectively, through a receiving port 507, 606, respectively. The receiving port 507, 606 may be in communication with the processor 505, 604, respectively.

The processor 505, 604 may be further configured to send messages, through a sending port 508, 607, which may be in communication with the processor 505, 604, and the memory 506, 605, respectively.

The first network node 111 may comprise other modules 509, which may be the processor 505 of the first network node 111, or an application running on such processor.

The wireless device 151, 152, 153 may comprise other modules 608, which may be the processor 604 of the wireless device 151, 152, 153, or an application running on such processor.

Those skilled in the art will also appreciate that the obtaining module 501, the scheduling module 502, the deciding module 503, the sending module 504, the obtaining module 601, the performing module 602, and the transmitting module 603 described above may refer to a combination of analog and digital modules, and/or one or more processors configured with software and/or firmware, e.g., stored in memory, that, when executed by the one or more processors such as the processors 505 and 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 501-504 and 601-603 described above may be implemented as one or more applications running on one or more processors such as the processors 503 and 604, respectively.

Thus, the methods according to the embodiments described herein for the first network node 111 or the wireless device 151, 152, 153 may be respectively implemented by means of a computer program product, comprising instructions, i.e., software code portions, which, when executed on at least one processor, cause the at least one processor to carry out the actions described herein, as performed by the first network node 111 or the wireless device 151, 152, 153, respectively. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 111 or the wireless device 151, 152, 153, respectively. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used.

Therefore, the above embodiments should not be taken as limiting the scope of the invention.

Examples Related to Embodiments Herein

Embodiments herein may relate, for example, to a method in a first network node configured to perform the method as follows:

A first network node, e.g. a eNode B, in a system with at least one HD-FDD UE and at least one FD-FDD UE is configured for:
 Obtaining a pattern of at least: a first type of time resources which are required for serving at least HD-FDD UEs, a second type of time resources which is not used or is not expected to be used by a HD-FDD UE due to transition at the HD-FDD UE between an UL and DL time resources and wherein the first type of time resources may also be used for scheduling FD-FDD UEs provided one or more conditions or criteria are met;
 Serving or scheduling a mixture of HD-FDD and FD-FDD UEs in a cell in time resources based on the obtained pattern, e.g., set of pattern, of the said time resources; and
 Transmitting, or signalling, or sending, optionally, the obtained pattern information to another network node or a UE.

Embodiments herein may be understood to relate to a method of scheduling in joint HD and FDD operation.

Embodiments herein may also relate, for example, to a method in a UE configured to perform the method as follows:

A UE is configured for:
 Obtaining information about the pattern of at least: a first type of time resources which are required for serving at least HD-FDD UEs, a second type of time resources which may only be used for FD-FDD UEs and wherein the first type of time resources may also be used for scheduling FD-FDD UEs provided one or more conditions or criteria are met; and
 Performing one or more operational tasks, e.g. saving UE battery power by turning it off in certain time resources not intended for use for the UE, based on the obtained pattern information.

Embodiments herein may also relate to the following first network node and wireless device examples, and the respective methods therein. The respective methods may comprise the following actions, which actions may as well be carried out in another suitable order than that described below. In some examples, all the actions may be carried out, whereas in other examples only some action/s may be carried out.

Figure 2:
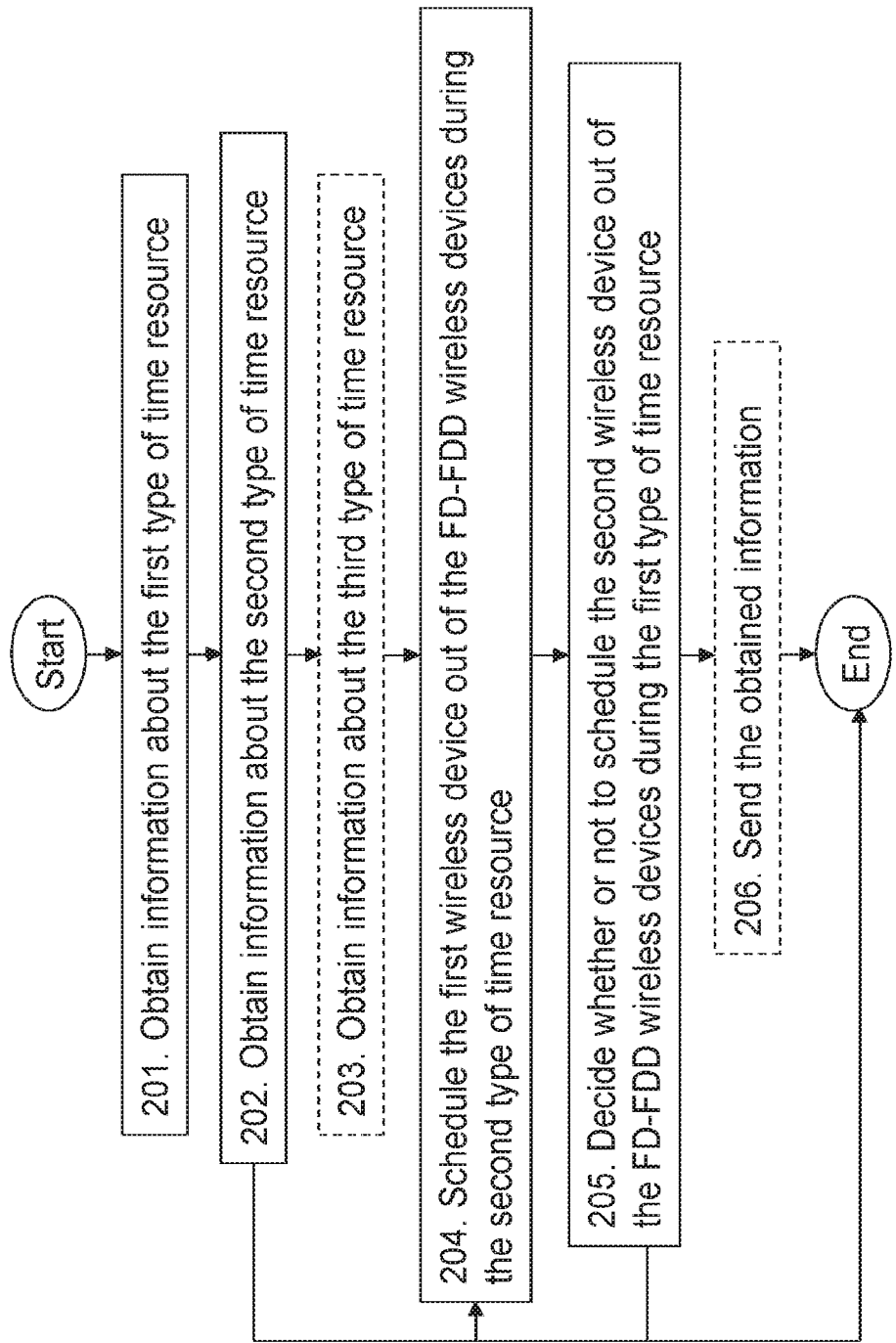
FIG. 2 is a flowchart depicting embodiments of a method in a first network node, according to embodiments herein.

The first network node examples relate to FIGS. 2, 3 and 5. The wireless device examples relate to FIGS. 3, 4 and 6.

A method in a first network node 111 for handling scheduling of one or more wireless devices, the first network node 111 operating in a wireless communications network 100, wherein a mixture of wireless devices 151, 152 comprising one or more Half Duplex-Frequency Division Duplex, HD-FDD wireless devices, also referred to herein as first wireless devices 151, and one or more Full Duplex-Frequency Division Duplex, FD-FDD, wireless devices, also referred to herein as second wireless devices 152, operate in the wireless communications network 100, the method comprising:
 obtaining information about at least one time resource of a first type of time resource, wherein the first type of time resource is for use, e.g., it is used or expected to be used at a future time, by at least one wireless device of the first wireless devices 151. The first network node 111 is configured to perform this action, e.g. by means of the obtaining module 501 within the first network node 111. The obtaining module 501 may be the processor 505 of the first network node 111, or an application running on such processor,
 obtaining information about at least one time resource of a second type of time resource, wherein the second type of time resource is not for use, e.g. it is not used or it is not expected to be used, by the first wireless devices 151, i.e., any of the first wireless devices 151, due to a transition at the first wireless devices 151 between UpLink, UL, and DownLink, DL, time resources. The first network node 111 is configured to perform this action, e.g. by means of the obtaining module 501 within the first network node 111;
 scheduling a first one or more wireless devices only of the second wireless devices 152 during the at least one time resource of the second type of time resource. The first network node 111 is configured to perform this action, e.g. by means of the scheduling module 502 within the first network node 111. The scheduling module 111 may be the processor 505 of the first network node 111, or an application running on such processor;
 deciding whether to schedule a second one or more wireless devices of the second wireless devices 152 during the first type of time resource, based on whether one or more first conditions are met. The first network node 111 is configured to perform this action, e.g. by means of the deciding module 503 within the first network node 111. The deciding module 503 may be the processor 505 of the first network node 111, or an application running on such processor;

In some examples, the time resource is one of a: symbol, time slot, subframe, TTI and interleaving time.

In some examples, the first type of time resource is used by the at least one of the first wireless devices 151, for performing one or more radio measurements and/or for data transmission or reception.

In some examples, the one or more first conditions comprise at least one of:
 a. the number of first wireless devices 151 in a first cell 121 served by the first network node 111 is below a first threshold;
 b. the number of first wireless devices 151 scheduled or expected to be scheduled during the first type of time resource is below a second threshold;
 c. a signaling quality during the first type of time resource is above a third threshold.

In some examples, the method further comprises:
 obtaining information about at least one time resource of a third type of time resource, which is any time resource other than the first and the second types of time resources. The first network node 111 is configured to perform this action, e.g. by means of the obtaining module 501 within the first network node 111.

In some examples, the obtained information comprises a pattern of at least one time resource of one or more of the first type of time resources, the second type of time resources and the third type of time resources.

In some examples, scheduling 204 further comprises scheduling the first one or more wireless devices only of the second wireless devices 152 during the third type of time resource.

In some examples, scheduling 204 further comprises scheduling the at least one of the first wireless devices 151 during the third type of time resource provided one or more second conditions are met.

In some examples, the one or more second conditions comprise one or more of the following:
  a. the number of second wireless devices 152 is below a fourth threshold in a first cell 121 served by the first network node 111;
  b. the number of second wireless devices 152 scheduled or expected to be scheduled during the third type of time resource is below a fifth threshold; and
  c. a signaling quality during the third type of time resource is above a sixth threshold.

In some examples, the first type of time resource is one or more of the following: a DL subframe 0, a DL subframe 5 or an UL subframe configured to transmit reference signal e.g., SRS.

In some examples, obtaining 201, 202, 203 information about one or more of the first, second and third types of time resources by one or more of the following comprises one of:
  a. autonomously determining, by the first network node 111 the information,
  b. receiving the information from a second network node 112 operating in the wireless communications network 100; and
  c. a pre-defined information.

In some examples, the method further comprises:
  sending, such as signalling, the obtained information about one or more of the first, second and third types of time resources to at least one of: a third network node 113 operating in the wireless communications network 100 and one or more of the first and/or second wireless devices 151, 152. The first network node 111 is configured to perform this action, e.g. by means of the sending module 504 within the first network node 111. The deciding module 504 may be the processor 505 of the first network node 111, or an application running on such processor.

In some examples, the obtaining information 201, 202, 203 is based on one or more types of time resources of the first, second and third types of time resources configured for use in at least the third network node 113.

The first network node 111 may comprise an interface unit to facilitate communications between the first network node 111 and other nodes or devices, e.g., UEs. The interface may, for example, include a transceiver configured to transmit and receive radio signals over an air interface in accordance with a suitable standard.

A method in a wireless device 151, 152 served by a first network node 111 for performing one or more operations, the wireless device 151, 152 and the first network node 111 operating in a wireless communications network 100, wherein a mixture of wireless devices 151, 152 comprising one or more Half Duplex-Frequency Division Duplex, HD-FDD wireless devices, also referred to herein as first wireless devices 151, and one or more Full Duplex-Frequency Division Duplex, FD-FDD, wireless devices, also referred to herein as second wireless devices 152 operate in the wireless communications network 100, the method comprising:
  obtaining information about at least one time resource of a first type of time resource, wherein the first type of time resource is for use, e.g., it is used or expected to be used at a future time, by at least one wireless device of the first wireless devices 151. The wireless device 151, 152 is configured to perform this action, e.g. by means of the obtaining module 601 within the wireless device 151, 152. The obtaining module 601 may be the processor 604 of the wireless device 151, 152, or an application running on such processor;
  obtaining information about at least one time resource of a second type of time resource, wherein the second type of time resource is not for use, e.g. it is not used or it is not expected to be used, by the first wireless devices 151, i.e., any of the first wireless devices 151, due to a transition at the first wireless devices 151 between UpLink, UL, and DownLink, DL, time resources. The wireless device 151, 152 is configured to perform this action, e.g. by means of the obtaining module 601 within the wireless device 151, 152;
  performing one or more operations based on the obtained information. The wireless device 151, 152 is configured to perform this action, e.g. by means of the performing module 602 within the wireless device 151, 152. The performing module 602 may be the processor 604 of the wireless device 151, 152, or an application running on such processor.

In some examples, the method further comprises:
  obtaining information about at least one time resource of a third type of time resource, which is any time resource other than the first and the second types of time resources. The wireless device 151, 152 is configured to perform this action, e.g. by means of the obtaining module 601 within the wireless device 151, 152.

In some examples, the information is obtained by one or more of:
  a. autonomous determination by the wireless device 151, 152,
  b. receiving information from the first network node 111,
  c. receiving information from the second network node 112 operating in the wireless communications network 100, and
  d. a pre-defined information.

In some examples, the operations are one or more of the following:
  a. storing the information;
  b. adapting wireless device battery power based on the obtained information,
  c. performing one or more measurements on signals of one or more:
    a. cells operating on one or more non-serving carrier frequencies, and/or
    b. Radio Access Technologies, RATs, other than that of a serving RAT, e.g., the serving RAT of the wireless device 151, 152, and
  d. processing data.

In some examples, the method further comprises:
  transmitting the obtained information to other nodes operating in the wireless communications network 100, the other nodes comprising at least one of: another wireless device 151, 152, a second network node 112, a third network node 113, and another node. The wireless device 151, 152 is configured to perform this action, e.g. by means of the transmitting module 603 within the wireless device 151, 152. The transmitting module 603 may be the processor 604 of the wireless device 151, 152, or an application running on such processor.

In some examples, the obtained information comprises a pattern of at least one time resource of one or more of: the first type of time resources, the second type of time resources and the third type of time resources.

The wireless device 151, 152 may comprise an interface unit to facilitate communications between the wireless device 151, 152 and other nodes or devices, e.g., the first network node 111. The interface may, for example, include a transceiver configured to transmit and receive radio signals over an air interface in accordance with a suitable standard.

Examples of the method in the first network node 111 described above relate to a method in a first network node for scheduling a mixture of HD-FDD and FD-FDD UEs, the method comprising:
  Obtaining information of at least one first type of time resource which is used or expected to be used by a HD-FDD UE;
  Obtaining information of at least one second type of time resource which is not used or is not expected to be used by a HD-FDD UE due to transition at the HD-FDD UE between an UL and DL time resources;
  Scheduling only FD-FDD UE during the at least one second type of time resource;
  Deciding whether to schedule FD-FDD UE also during the first type of time resource depending upon whether one or more first conditions are met.

In some examples, the time resource is one of a: symbol, time slot, subframe, TTI and interleaving time.

In some examples, the first type of time resource is used by the HD-FDD UE for performing one or more radio measurements and/or for data transmission or reception.

In some examples, the scheduling further comprises scheduling the FD-FDD UE also during the first type of time resource provided one of more of the following conditions are met:
  a. a number of HD-FDD UEs is below a threshold in a cell;
  b. a number of HD-FDD UEs scheduled or expected to be scheduled during the first type of time resource is below a threshold;
  c. a signaling quality during the first type of time resource is above a threshold.

In some examples, the method further comprises determining at least one third type of time resource, which is any time resource other than the first and the second types of time resources.

In some examples, scheduling further comprises scheduling at least FD-FDD UE in the third type of time resource.

In some examples, the scheduling further comprises scheduling also HD-FDD UE in the third type of time resource provided one or more second conditions are met.

In some examples, the second condition comprises one or more of the following:
  a. a number of FD-FDD UEs is below a threshold in a cell;
  b. a number of FD-FDD UEs scheduled or expected to be scheduled during the third type of time resource is below a threshold;
  c. a signaling quality during the third type of time resource is above a threshold;

In some examples, the first type of time resource is one or more of the following: a DL subframe 0, a DL subframe 5 or a UL subframe configured to transmit a reference signal, e.g., a SRS.

In some examples, obtaining information about one or more of the first, second, and third types of time resources is performed by one or more of the following means:
  a. Autonomous determination by the first network node and
  b. Information received from the second network node.

In some examples, the method further comprises signaling information about one or more of the first, second and third types of time resources to the third network node.

In some examples, the method further comprises signaling information about one or more of the first, second and third types of time resources to HD-FDD and/or FD-FDD UEs.

In some examples, the method further comprises determining one or more of the first, second and third types of time resources based on the one or more of the first, second and third types of time resources configured for use in at least the third network node.

Examples of the method in the wireless device 151, 152, 153 described above relate to a method in a UE served by a first network node, the method comprising:
  a. Obtaining a pattern of at least one of a first type of time resources, a second type of time resources and a third type of time resources wherein,
    i. the first type of time resource is used or expected to be used by a HD-FDD UE; the second type of time resource is not used or is not expected to be used by a HD-FDD UE due to transition at the HD-FDD UE between an UL and DL time resources and the third type of time resource is any time resource other than the first and the second types of time resources
  b. performing one or more operations based on the obtained pattern of time resources.

In some examples, the pattern is obtained from one or more of:
  a. autonomous determination by the UE,
  b. receiving information from the first network node and,
  c. receiving information from the second network node In some examples, operations are one or more of the following:
  d. Storing the pattern and using it at a future time;
  e. Adapting UE battery power based on the pattern;
  f. Transmitting the pattern to other nodes e.g. UE and/or the second network node and/or the third network node.

The invention claimed is:

1. A non-transitory computer-readable medium storing a program code executable by a controller, wherein when the controller is coupled to a first network node operating in a wireless communications network, the execution of the program code causes the controller to:
  obtain information about a first type of time resource, wherein the first type of time resource is to be used by at least one wireless device of one or more Half Duplex-Frequency Division Duplex (HD-FDD) wireless devices;
  obtain information about a second type of time resource, wherein the second type of time resource is not to be used by the one or more HD-FDD wireless devices due to a transition at the one or more HD-FDD wireless devices between Uplink (UL) and Downlink (DL) time resources;
  schedule a first wireless device out of one or more Full Duplex-Frequency Division Duplex (FD-FDD) wireless devices during the second type of time resource, based on the obtained information about the second type of time resource; and
  decide whether or not to schedule a second wireless device out of the one or more FD-FDD wireless devices during the first type of time resource, based on the obtained information about the first type of time resource, and further based on whether one or more first conditions are met.

2. The non-transitory computer-readable medium of claim 1, wherein the one or more first conditions comprise one or more of:

a number of HD-FDD wireless devices in a first cell served by the first network node is below a first threshold;

a number of HD-FDD wireless devices scheduled or to be scheduled during the first type of time resource is below a second threshold; and a signal quality during the first type of time resource is above a third threshold.

3. The non-transitory computer-readable medium of claim 1, wherein the execution of the program code further causes the controller to:

obtain information about a third type of time resource, the third type of time resource being a time resource other than the first and the second types of time resources.

4. The non-transitory computer-readable medium of claim 3, wherein the obtained information about the first type, the second type, and the third type of time resource comprises a pattern of at least one of:

the first type of time resource,
the second type of time resource, and
the third type of time resource.

5. The non-transitory computer-readable medium of claim 3, wherein the execution of the program code further causes the controller to:

schedule a third wireless device out of the one or more FD-FDD wireless devices during the third type of time resource, when one or more second conditions are met.

6. The non-transitory computer-readable medium of claim 5, wherein the one or more second conditions comprise one or more of:

a number of FD-FDD wireless devices in a first cell served by the first network node is below a fourth threshold;

a number of FD-FDD wireless devices scheduled or expected to be scheduled during the third type of time resource is below a fifth threshold; and a signaling quality during the third type of time resource is above a sixth threshold.

7. The non-transitory computer-readable medium of claim 3, wherein in obtaining the information about at least one of the first, second, and third types of time resource, the execution of the program code further causes the controller to:

autonomously determine the information about the at least one of the first, second, and third types of time resource, receive the information about the at least one of the first, second, and third types of time resource, from a second network node configured to operate in the wireless communications network;

receive the information about the at least one of the first, second, and third types of time resource, from another wireless device; or read pre-defined or stored information.

8. The non-transitory computer-readable medium of claim 3, wherein the execution of the program code further causes the controller to:

send the obtained information about any of the first, second, and third types of time resource to at least one of:

a third network node configured to operate in the wireless communications network,
an HD-FDD wireless device, and
an FD-FDD wireless device.

9. The non-transitory computer-readable medium of claim 3, wherein the execution of the program code further causes the controller to:

select one or more types of time resources of the first, second and third type based on one or more of the following criteria:

type of radio measurements to be performed by the at least one wireless device of the one or more HD-FDD wireless devices, type of base station radio measurements performed on signals transmitted by the at least one wireless device of the one or more HD-FDD wireless devices;

number of time resources needed for wireless device radio measurements performed by the at least one wireless device of the one or more HD-FDD wireless devices;

number of time resources needed for base station radio measurements on signals transmitted by the at least one wireless device of the one or more HD-FDD wireless devices;

time synchronization level between cells on which the at least one wireless device of the one or more HD-FDD wireless devices performs measurements;

UL resources needed for enabling a wireless device served by the first network node to send a measurement report to the first network node; and Discontinuous Reception (DRX)/Discontinuous Transmission (DTX), configuration of wireless devices in a first cell served by the first network node.

10. The non-transitory computer-readable medium of claim 1, wherein the time resource is one of a: symbol, time slot, subframe, Transmission Time Interval (TTI), and interleaving time.

11. The non-transitory computer-readable medium of claim 1, wherein the first type of time resource is DL subframe 0 configured to transmit a reference signal.

12. The non-transitory computer-readable medium of claim 1, wherein the first type of time resource is DL subframe 5 configured to transmit a reference signal.

13. The non-transitory computer-readable medium of claim 1, wherein the first type of time resource is UL subframe configured to transmit a reference signal.

14. A non-transitory computer-readable medium storing a program code executable by a controller, wherein when the controller is coupled to a first wireless device that is served by a first network node in a wireless communications network, the execution of the program code causes the controller to:

obtain information about a first type of time resource, wherein the first type of time resource is to be used by at least one wireless device of one or more Half Duplex-Frequency Division Duplex (HD-FDD) wireless devices;

obtain information about a second type of time resource, wherein the second type of time resource is not to be used by the one or more HD-FDD wireless devices due to transition at the one or more HD-FDD wireless devices between Uplink (UL) and Downlink (DL) time resources;

perform one or more operations based on the obtained information about the first type and the second type of time resource, the one or more operations comprise at least one of:

adapting wireless device battery power based on the obtained information, performing a measurement on a signal of a cell operating on a non-serving carrier frequency, and performing a measurement on a signal of a Radio Access Technology (RAT) that is not serving the first wireless device.

15. The non-transitory computer-readable medium of claim 14, wherein the execution of the program code further causes the controller to:
   obtain information about a third type of time resource, the third type of time resource a time resource other than the first and the second types of time resources.

16. The non-transitory computer-readable medium of claim 15, wherein the obtained information about the first type, the second type, and the third type of time resource comprises a pattern of at least one of:
   the first type of time resource,
   the second type of time resource, and
   the third type of time resource.

* * * * *